United States Patent
Topucharla et al.

(10) Patent No.: US 7,965,483 B2
(45) Date of Patent: Jun. 21, 2011

(54) ELECTRONIC TRIP UNIT OF A CIRCUIT BREAKER

(75) Inventors: Srinath Rao Topucharla, Secunderabad (IN); Craig Benjamin Williams, Louisville, KY (US); Seshagiri Rao Komaravolu, Hyderabad (IN)

(73) Assignee: General Electric Company, Schenectady, NY (US)

( * ) Notice: Subject to any disclaimer, the term of this patent is extended or adjusted under 35 U.S.C. 154(b) by 463 days.

(21) Appl. No.: 12/209,672

(22) Filed: Sep. 12, 2008

(65) Prior Publication Data

US 2010/0067159 A1    Mar. 18, 2010

(51) Int. Cl.
   *H02H 3/08* (2006.01)
(52) U.S. Cl. ........................................ 361/93.2
(58) Field of Classification Search ................ 361/93.1, 361/93.2
   See application file for complete search history.

(56) References Cited

U.S. PATENT DOCUMENTS

| 5,568,343 A * | 10/1996 | Kosugi ............................. 361/36 |
| 6,252,752 B1 * | 6/2001 | Nagahama ....................... 361/31 |
| 6,580,258 B2 * | 6/2003 | Wilcox et al. .................. 323/282 |

* cited by examiner

*Primary Examiner* — Stephen W Jackson
*Assistant Examiner* — Tien Mai
(74) *Attorney, Agent, or Firm* — Cantor Colburn LLP

(57) ABSTRACT

An electronic trip unit which includes a processing unit and a comparator circuit. The processing unit receives an input voltage, and a reset signal to reset the electronic trip unit, and generates a trip signal when sensed current of the electronic trip unit exceeds a predetermined threshold. The comparator circuit includes a first comparator which receives the trip signal from the processing unit and compares the trip signal with a predetermined reference voltage determined based on the reset signal, and a second comparator which compares a voltage generated by a power supply with the predetermined reference voltage. The comparator circuit determines whether the trip signal is for a valid trip event based comparison results of the first comparator and the second comparator.

18 Claims, 3 Drawing Sheets

ELECTRONIC TRIP UNIT OF A CIRCUIT BREAKER

BACKGROUND

This invention relates to an electronic trip unit. More particularly, this invention relates to an electronic trip unit capable of eliminating nuisance tripping at low power in the electronic trip unit.

An electronic trip unit is an intelligent device which controls a circuit breaker. Generally, a microprocessor-controlled electronic trip unit automatically operates the circuit breaker under fault current conditions such as a short-circuit or an overcurrent. The microprocessor-controlled trip unit trips to open the electrical circuit, and therefore, interrupts current flow. The electronic trip unit employs a microcontroller which compares sensed current input with predetermined values and generates a trip pulse when the sensed current exceeds the predetermined values. The generated trip pulse is then used to turn on a MOSFET which energizes a solenoid/flux shifter to trip the circuit breaker.

There are several problems associated with the conventional electronic trip unit. One problem is that the electronic trip unit may exhibit nuisance tripping which can be caused by a malfunction of the microcontroller or glitches from the microcontroller ports at low power. That is, during a self-power mode of the electronic trip unit, when the electronic trip unit voltage is in a range where the microcontroller is in a RESET toggling condition (i.e., when the RESET signal is not stable and changes between high and low values), the noise pick up of the printed circuit board (PCB) track between the microcontroller to the gate of the MOSFET. Therefore, there is a need for an electronic trip unit which filters out microcontroller glitches and PCB noise to ensure that the trip signal is based on a valid fault case.

BRIEF DESCRIPTION

An exemplary embodiment of the present invention provides an electronic trip unit of a circuit breaker. An electronic trip unit which includes a processing unit and a comparator circuit. The processing unit receives an input voltage and a reset signal to reset the electronic trip unit, and generates a trip signal when sensed current of the electronic trip unit exceeds a predetermined threshold. The comparator circuit includes a first comparator which receives the trip signal from the processing unit and compares the trip signal with a predetermined reference voltage determined based on the reset signal, and a second comparator which compares a voltage generated by a power supply with the predetermined reference voltage. The comparator circuit determines whether the trip signal is for a valid trip event based on comparison results of the first and second comparators.

Another exemplary embodiment of the present invention provides a method of controlling an electronic trip unit of a circuit breaker. The method including generating a trip signal via a processing unit of the electronic trip unit, when sensed current of the electronic trip unit exceeds a predetermined threshold, comparing the trip signal with a predetermined reference voltage via a first comparator, comparing a voltage generated by a power supply with the predetermined reference voltage via a second comparator, and determining that the trip signal is for a valid trip event when the trip signal and the voltage generated by the power supply exceed the predetermined reference voltage.

Additional features and advantages are realized through the techniques of exemplary embodiments of the invention.

Other embodiments and aspects of the invention are described in detail herein and are considered a part of the claimed invention. For a better understanding of the invention with advantages and features thereof, refer to the description and to the drawings.

DETAILED DESCRIPTION

Figure 1:
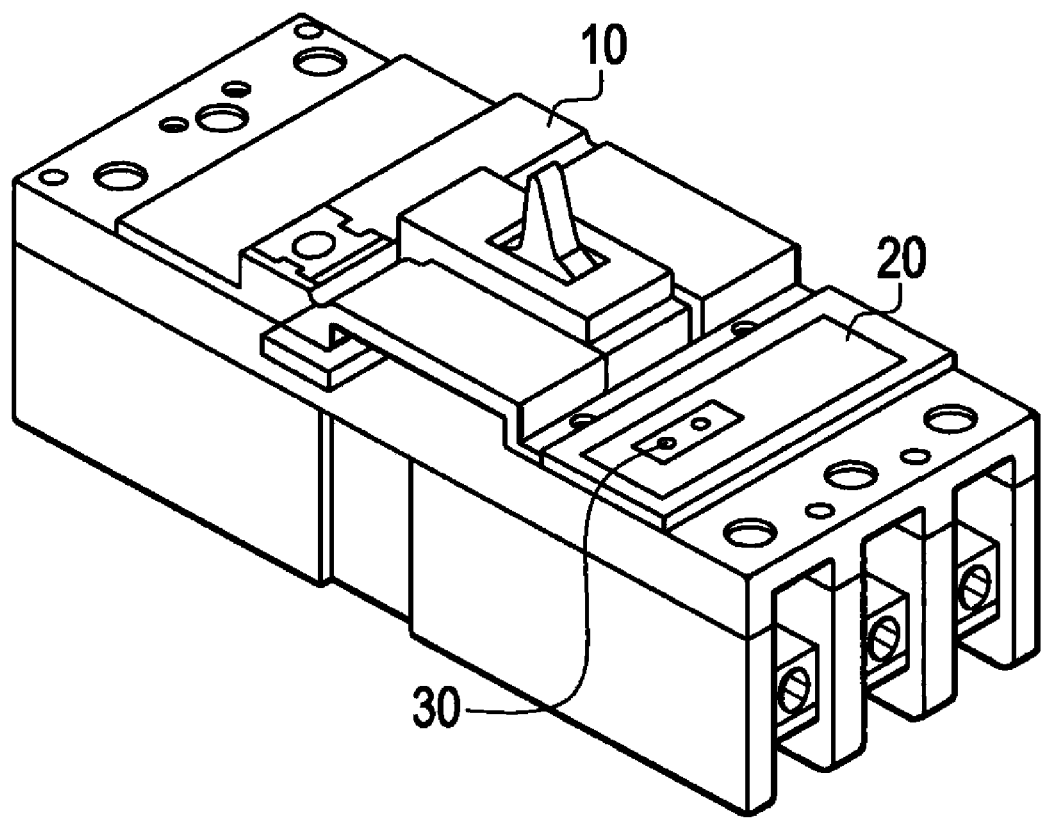
FIG. 1 is a schematic diagram of a circuit breaker that can be implemented within embodiments of the present invention.
Figure 2:
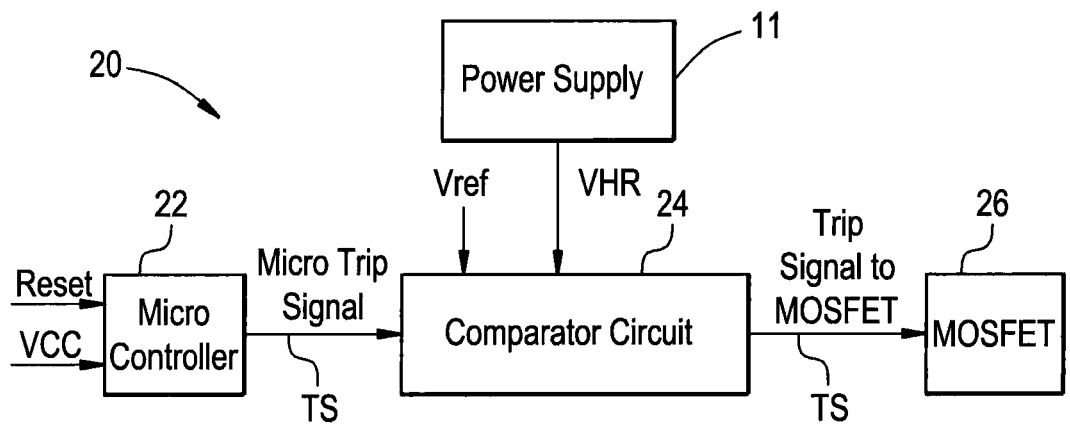
FIG. 2 is a schematic diagram of an electronic trip unit of the circuit breaker of FIG. 1 that can be implemented within embodiments of the present invention.

Turning now to the drawings in greater detail, it will be seen that in FIG. 1, there is a circuit breaker 10 which includes an electronic trip unit 20 and a rating plug 30 coupled to the electronic trip unit 20. The trip unit 20 of the circuit breaker 10 trips to open an electric circuit, and therefore, interrupts current flow when necessary. The rating plug 30 sets a current rating which is maximum continuous current permitted in the electronic circuit during each individual phase and supplies a specified current rating to the electronic trip unit 20. Current transformers (CT) in the circuit breaker 10 (one associated with each phase of current in a multi-phase system) (not shown) provide current to the electronic trip unit 20. The current is sent to a printed circuit board (PCB) (not shown), and is rectified and used to charge a voltage high rail (VHR) capacitor (not shown) which is an input capacitor. The voltage across the input capacitor, for example, a VHR voltage is regulated by a voltage regulator circuit (not shown) which ensures that the VHR voltage is within a predetermined voltage limit under normal operation. Therefore, according to an embodiment of the present invention, the voltage is generated by a power supply 11 (as depicted in FIG. 2, for example). The power supply 11 may be a CT within the circuit breaker 10 as mentioned above, or an external power supply outside of the circuit breaker 10. The voltage represents the stability of the power supply 11. Further, the voltage is provided to the PCB and an actuator (depicted in FIG. 3) to trip the circuit breaker 10 when necessary. For the purpose of illustration in the drawings, a VHR voltage is discussed herein, however, the present invention is not limited hereto.

FIG. 2 illustrates a schematic diagram of an electronic trip unit that can be implemented within embodiments of the present invention. As shown in FIG. 2, the electronic trip unit 20 includes a processing unit i.e., a microcontroller 22, a comparator circuit 24 and a switching device 26. The microcontroller 22 receives an input voltage VCC, and a power ON reset signal RESET to reset the electronic trip unit, and generates a trip signal TS when sensed current of the circuit breaker 10 exceeds a predetermined threshold. According to an exemplary embodiment of the present invention, the reset signal RESET is derived from either the input voltage VCC or from a voltage reset supervising integrated circuit (not shown). If the reset signal RESET is derived from the input voltage VCC, using an RC delay charging circuit, the reset signal RESET is compared with the input voltage VCC via a comparator (not shown). The output of the comparator will be high only when the RC delay charging circuit voltage is above approximately 4.6V. Alternatively, if the reset signal RESET is derived from the voltage reset supervising IC, the output of the voltage reset supervising IC is high when the input voltage VCC rises above approximately 4.6V and is low when the input voltage VCC drops below approximately 4.6V. According to an exemplary embodiment, the input voltage VCC is approximately 5 V. Further, according to an exemplary embodiment, the input voltage VCC is derived from the VHR voltage.

According to an exemplary embodiment, the comparator circuit 24 receives the trip signal TS from the microcontroller 22 and determines whether the trip signal TS generated by the microcontroller 22 is based on a valid trip event such as a short-circuit, an overcurrent or ground fault, etc. or a invalid trip event such as microcontroller malfunctions or glitches and noise pickup by PCB tracks, for example. A trip pulse pin of the microcontroller 22 is connected to the comparator circuit 24. According to one embodiment, the comparator circuit 24 includes a first comparator 38 (depicted in FIG. 3) and a second comparator 46 (depicted in FIG. 3). A detailed description of the comparator circuit 24 will be described below with reference to FIG. 3.

Further, as shown in FIG. 2, the electronic trip unit 20 further includes a switching device 26 which receives a trip signal TS from the comparator circuit 24 when the output of the comparator circuit 24 is representative of a valid trip event, and an actuator 36 (depicted in FIG. 3) which receives the trip signal TS from the switching device 26 and trips the circuit breaker 10 when it is determined that a valid trip event has occurred. According to an exemplary embodiment, the switching device 26 is metal oxide silicon field effect transistor (MOSFET), a silicon controlled rectifier (SCR) or an insulated gate bipolar transistor (IGBT), for example. However, the present invention is not limited hereto and any suitable switching device may be used.

A description of the comparator circuit 24 shown in FIG. 2 will now be described with reference to FIG. 3.

Figure 3:
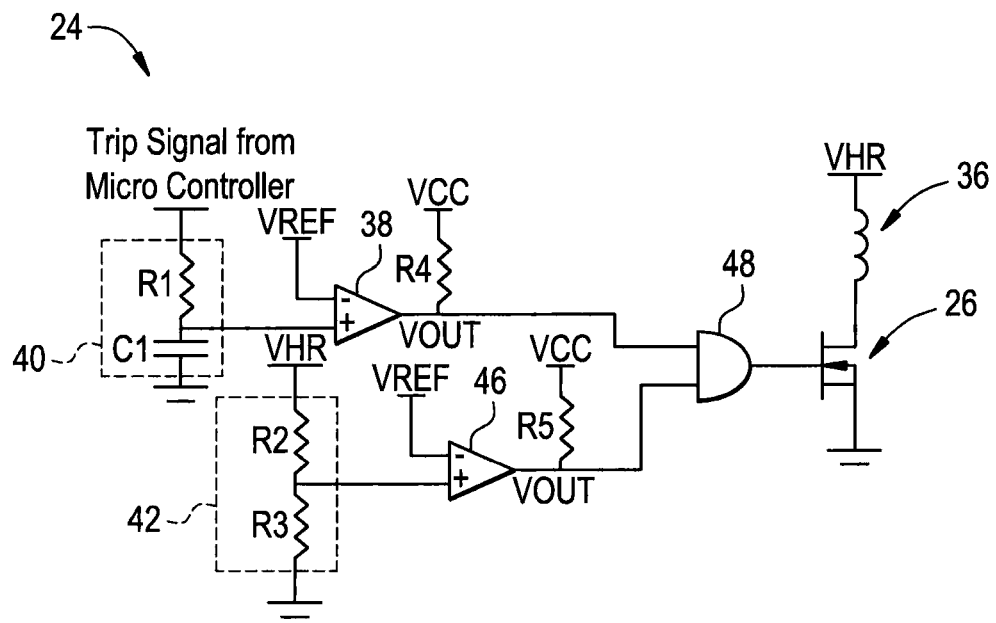
FIG. 3 is a circuit schematic diagram of a comparator circuit of the electronic trip unit of FIG. 2 that can be implemented within embodiments of the present invention.

FIG. 3 is a circuit schematic diagram illustrating the comparator circuit of FIG. 2 that can be implemented within embodiments of the present invention. As shown in FIG. 3, according to an exemplary embodiment, the comparator circuit 24 may include a filter circuit 40 which receives the trip signal TS generated by the microcontroller 22 and filters noise from the trip signal TS. According to an exemplary embodiment, the noise may be PCB noise Pick up and any noise pick up by a gate signal track if there is a nearby track in which high current, voltage analog or digital signal passing through. The first comparator 38 including an inverting input and a non-inverting input, and receives a predetermined reference voltage VREF derived from the input voltage VCC, at the inverting input, and the trip signal from the microcontroller 22 at the non-inverting input, and compares the trip signal TS with the predetermined reference voltage VREF. Alternatively, the filter circuit 40 may receive the trip signal from the microcontroller 22 and filters the trip signal and transmits the filtered trip signal at the non-inverting input of the first comparator 38. The first comparator 38 further includes a pull-up resistor R4 which receives the input voltage VCC and pulls an output voltage VOUT of the first comparator 38 toward the input voltage VCC. According to an exemplary embodiment of the present invention, the predetermined reference voltage VREF is determined based on a state of the reset signal RESET received by the microcontroller 22. Thus, when the reset signal RESET is high (i.e. stable reset high), the predetermined reference voltage VREF is approximately 2.5V.

According to an exemplary embodiment, the filter circuit 40 includes an RC filter having a resistor R1 and a capacitor C1. Alternatively, according to another exemplary embodiment, the filter circuit 40 includes a band pass filter 50 (depicted in FIG. 4), for example.

According to an exemplary embodiment, the comparator circuit 24 further includes a resistor divider 42 including a pair of resistors R2 and R3, which receives the VHR voltage. The second comparator 46 includes an inverting input and a non-inverting input, and receives the predetermined reference voltage VREF at the inverting input, and is connected with the resistor divider 42 at the non-inverting input. The second comparator 46 compares the VHR voltage with the predetermined reference voltage VREF to determine whether the VHR voltage is above an energy level required to fire the actuator 36 under a valid fault event. A pull-up resistor R5 is also provide and receives the input voltage VCC and pulls an output voltage VOUT of the second comparator 46 towards the input voltage VCC. The present invention is not limited to the use of a resistor divider, and may vary accordingly.

According to an exemplary embodiment, the comparator circuit 24 determines whether the trip signal TS is for a valid trip event based on the comparison results of the first comparator 38 and the second comparator 46.

According to an exemplary embodiment, the comparator circuit 24 further includes a logic gate 48 which receives an output of the first comparator 38 and an output of the second comparator 46, and is connected with a gate of the switching device 26 such that an output of the logic gate 48 is transmitted to the gate of the switching device 26 when the output the logic gate 48 is logically high. That is, the trip signal TS is transmitted to the switching device 26 when both the trip signal TS and the VHR voltage exceed the predetermined reference voltage VREF. Alternatively, when the output of logic gate 48 is logically low, the comparator circuit 24 determines that the trip signal TS is based on an invalid trip event. That is, when it is determined by the first comparator 38 and the second comparator 46, that either the trip signal TS or the VHR voltage is less than the predetermined reference voltage VREF, the output of the comparator circuit 24 is logically low, and thus, the trip signal TS is not transmitted to the gate of the switching device 26. Thus, at low power or at startup, even when glitches from the microcontroller 22 or noise pickup in the PCB tracks is above the gate signal of the switching device 26, the signal output from the logic gate 48 will not pass to the switching device 26.

According to the current exemplary embodiment, the logic gate 48 is a logic AND gate, however, the present invention is not limited hereto. Alternatively, the logic gate 48 may be a logic OR gate, for example.

Figure 4:
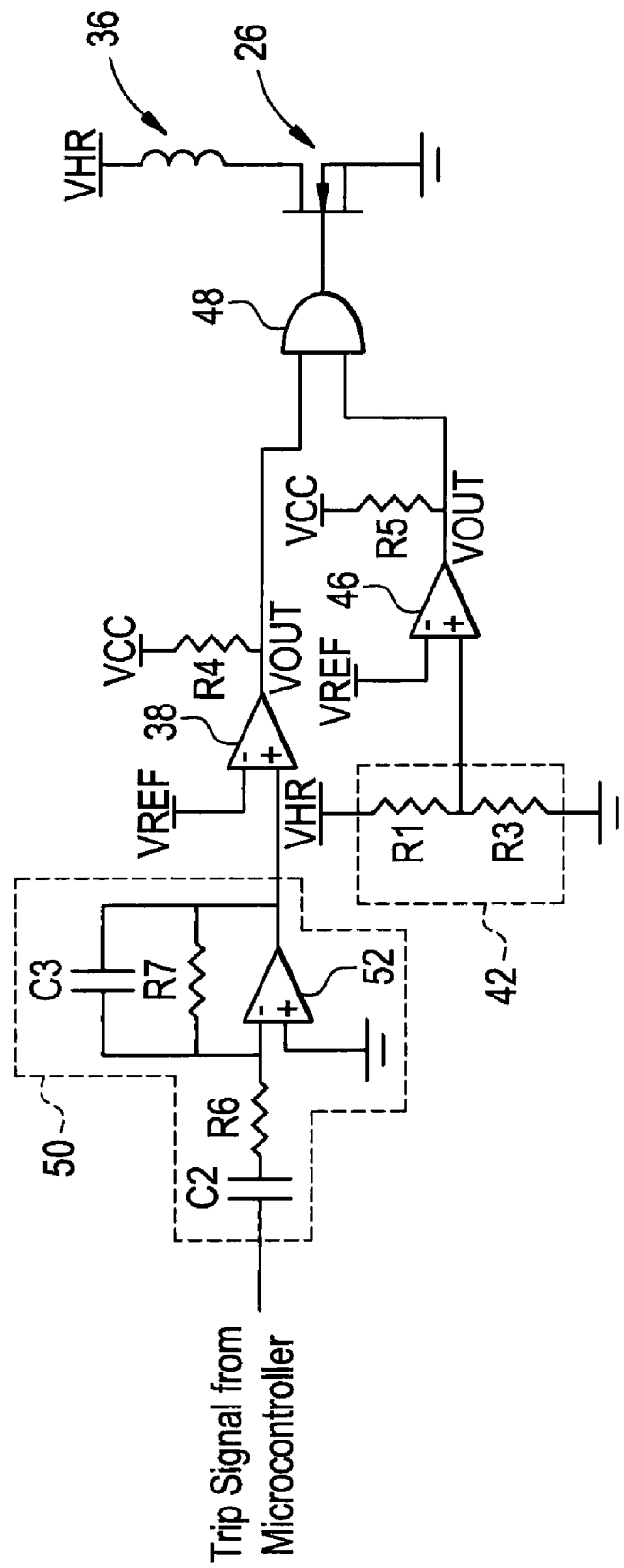
FIG. 4 is a circuit schematic diagram of a comparator circuit of the electronic trip unit of FIG. 2 that can be implemented within alternative embodiments of the present invention.

FIG. 4 is a circuit schematic diagram of a comparator circuit that can be implemented within alternative exemplary embodiments of the present invention. Some of the features of FIG. 4 are the same as those illustrated in FIG. 3, therefore, the same reference numerals are utilized for the same features and a detailed description thereof is omitted. As shown in FIG. 4, a band pass filter 50 is provided at a non-inverting input of the first comparator 38. The band pass filter 50 includes capacitors C2 and C3, resistors R6 and R7 and a comparator 52. The band pass filter 50 requires the frequency of the trip signal TS received from the microcontroller 22 to be of a predetermined frequency, for example, 1 Khz. Thus, the trip signal TS is transmitted to the switching device 26 when it is determined that the frequency thereof is equal to the predetermined frequency. Therefore, when the frequency is less than or greater than the predetermined frequency, the trip signal will not be transmitted to the switching device 26 to trip the circuit breaker 10.

According to an exemplary embodiment, the present invention is not limited to being utilized to control a MOSFET and can be used in any other switching devices such as IGBT, power transistors, etc. In addition, the same logic may be implemented in analog switches.

Further, according to an exemplary embodiment, the electronic trip unit ensures that the VHR voltage is above an energizing level of the actuator (i.e., flux shifter) before the trip signal is applied to the switching device.

According to an exemplary embodiment of the present invention, the use of the comparator circuit to filter the trip signal generated by the processing unit prevents nuisance tripping of the circuit breaker which may be caused by a malfunction of the microcontroller, glitches from the microcontroller at a low power (during self power mode of the electronic trip unit) and PCB noise pickup.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. An electronic trip unit comprising:
   a microcontroller which receives an input voltage and a reset signal, and generates a trip signal when sensed current of the electronic trip unit exceeds a predetermined threshold; and
   a comparator circuit comprising:
      a first comparator which receives the trip signal from the microcontroller and compares the trip signal with a predetermined reference voltage based on the reset signal, and
      a second comparator which compares a voltage generated by a power supply with the predetermined reference voltage, wherein the comparator circuit determines whether the trip signal is for a valid trip event based on comparison results of the first and second comparators.

2. The electronic trip unit of claim 1, wherein the output of the comparator circuit is logically high when the trip signal and the voltage exceed the predetermined reference voltage, facilitating transmission of the trip signal to cause the circuit breaker to trip.

3. The electronic trip unit of claim 2, further comprising:
   a switching device which receives the trip signal from the comparator circuit when the output of the comparator circuit is representative of a valid trip event; and
   an actuator which receives the trip signal from the switching device and trips the circuit breaker.

4. The electronic trip unit of claim 3, wherein the switching device comprises at least one of a metal oxide silicon field effect transistor, a silicon controlled rectifier and an insulated gate bipolar transistor.

5. The electronic trip unit of claim 3, wherein when the output of the comparator circuit is logically low, the comparator circuit determines that the trip signal is based on an invalid trip event.

6. The electronic trip unit of claim 1, wherein the comparator circuit further comprises:
   the first comparator including an inverting input and a non-inverting input, and receives the predetermined reference voltage at the inverting input and the trip signal at the non-inverting input, and compares the trip signal with the predetermined reference voltage; and
   a pull-up resistor which receives the input voltage and pulls an output voltage of the first comparator towards the input voltage.

7. The electronic trip unit of claim 6, wherein the comparator circuit further comprises:
   a resistor divider including a pair of resistors, which receives the voltage generated from the power supply;
   the second comparator including an inverting input and a non-inverting output, which receives the predetermined reference voltage at the inverting input, and is connected with the resistor divider at the non-inverting input, and compares the voltage with the predetermined reference voltage; and
   a pull-up resistor which receives the input voltage and pulls an output voltage of the second comparator towards the input voltage.

8. The electronic trip unit of claim 6, wherein the comparator circuit further comprises a filter circuit connected at the non-inverting input of the first comparator and receiving the trip signal generated by the microcontroller and filtering noise from the trip signal, wherein the filtered trip signal is compared with the predetermined reference voltage by the first comparator.

9. The electronic trip unit of claim 8, wherein the filter circuit includes an RC filter having a resistor and a capacitor, or a band pass filter.

10. The electronic trip unit of claim 7, wherein the predetermined reference voltage is approximately 2.5 V and the input voltage is approximately 5V.

11. The electronic trip unit of claim 10, wherein the comparator circuit further comprises:
    a logic gate which receives an output of the first comparator and an output of the second comparator, and is connected with a gate of the switching device such that an output of the logic gate is transmitted to the gate of the switching device when the output of the logic gate is logically high.

12. The electronic trip unit of claim 11, wherein the logic gate is a logic AND gate.

13. The electronic trip unit of claim 9, wherein when the filter circuit is a band pass filter, and the filtered trip signal is transmitted to the switching device when it is determined that a frequency of the filtered trip signal is equal to a predetermined frequency.

14. The electronic trip unit of claim 13, wherein the predetermined frequency is equal to approximately 1 Khz.

15. A method of controlling an electronic trip unit of a circuit breaker, the method comprising:
    generating a trip signal via a microcontroller of the electronic trip unit, when sensed current of the electronic trip unit exceeds a predetermined threshold;
    comparing the trip signal with a predetermined reference voltage via a first comparator;
    comparing a voltage generated by a power supply with the predetermined reference voltage via a second comparator; and determining that the trip signal is for a valid trip event when it is determined that the trip signal and the voltage generated by the power supply exceed the predetermined reference voltage.

16. The method of claim 15, further comprising:

transmitting the trip signal to a switching device when it is determined that the trip signal is for a valid trip event; and tripping the circuit breaker based on the transmitted trip signal.

17. The method of claim 15, wherein the predetermined voltage is approximately 2.5V.

18. The method of claim 15, further comprising: filtering noise from the generated trip signal prior to comparing the trip signal with the predetermined reference voltage.

* * * * *